United States Patent

Baik

[11] Patent Number: 5,963,706
[45] Date of Patent: Oct. 5, 1999

[54] CONTROL SYSTEM FOR MULTI-PHASE BRUSHLESS DC MOTOR

[76] Inventor: Edward Hyeen Baik, 25822 Terra Bella, Laguna Hills, Calif. 92653

[21] Appl. No.: 08/956,750

[22] Filed: Oct. 23, 1997

[51] Int. Cl.[6] ............................................. H02P 5/06
[52] U.S. Cl. ........................ 388/804; 388/806; 318/254; 318/138; 318/439
[58] Field of Search ................................... 388/804, 806; 318/254, 138, 439

[56] References Cited

U.S. PATENT DOCUMENTS

| 4,088,108 | 5/1978 | Hager | 318/254 |
| 4,882,524 | 11/1989 | Lee | 318/254 |

Primary Examiner—Karen Masih

[57] ABSTRACT

The motor control system is operable with multi-phase bipolar parallel winding brushless DC motor. The motor control system includes multi-phase bipolar H-bridge circuits which change current flow direction as the output signal from motor encoder changes. The motor control system is responsive to the speed control circuit to control speed and to the fault detection circuit to give maximum safety and control. The motor control system provides controlled phase signal to individually enable each phase of the stator windings to selectively control the speed of the motor. The motor control system also has a conventional pulse width modulation driver for providing power to the motor. The motor control system of the present invention utilizes both modes to fully utilize the motor's capabilities and at the same time saves power and reduces loading in each of the H-bridges driving stator windings.

22 Claims, 15 Drawing Sheets

CONTROL SYSTEM FOR MULTI-PHASE BRUSHLESS DC MOTOR

BACKGROUND OF THE INVENTION

1. Field of the Invention

This invention relates to a motor controller, and more particularly, to a motor controller for controlling a multi-phase bipolar parallel winding brushless DC motor.

2. Description of Related Art

In a multi-phase bipolar brushless DC motor, a permanent magnet having a plurality of poles is used instead of field coils for the rotor and an armature is used for the stator. There is a plurality of coils wound on the stator, each coil representing an independent phase winding. For example, a stator with 6 phases has 6 independent windings, each winding presenting one phase. This type of motor is described in U.S. Pat. No. 4,882,524 issued Nov. 21, 1989 to Lee, which is incorporated by reference as if stated fully herein.

The typical multi-phase DC motor has a stator with a number of phases. Each phase has a plurality of windings, which are connected in series and positioned around the circumference of the rotor. In addition, each phase is connected independent of the winding connection of the other phases. The rotor comprises a number of permanent magnetic poles and rotates in response to the direction of the current in the windings.

To drive the multi-phase DC motor, a commutation encoder and photo interrupters or hall effect devices work in combination to provide synchronized currents to the motor. For example, a photo interrupter, which is responsive to a light source, is turned on or off depending on the position of a commutation encoder and controls a transistor connected to one of the stator windings. A pair of photo interrupters per each phase is arranged in the commutation encoder. Such an arrangement allows each phase to be enabled in a sequential manner so that the maximum current can be applied.

Alternative to using the photo interrupter and commutation encoder is to use a pulse width modulation (PWM) technique to control speed of the motor. The PWM technique simply generates a pulse having a predetermined duty cycle to drive all of the phase windings. As the pulse has a longer on period, the faster the motor rotates.

However, the disadvantage of the above configuration is that the current applied to each phase winding controls the torque and speed of the motor. Because all of the phases must be turned on in a sequential or a predetermined order to maintain the rotation of the motor, current is provided to all of the phase windings.

A conventional DC motor control system or brushless DC motor control system utilizes a PWM method with one or one-half H-bridge configuration. As a result, the electrical current to the motor must flow through the only H-bridge coupled to the DC motor. The H-bridge, therefore, is typically made with power MOSFET's or Isolated Gate Bipolar Transistors (IGBT). For example, a MOSFET of a conventional H-bridge must handle 100 amps of current. In addition, because of the high current requirement of the PWM, there are many limitations to the controller circuit caused by excessive heat dissipation from the internal circuit semiconductor devices, which are sensitive to heat, and high current.

SUMMARY OF THE DISCLOSURE

It is an object of the present invention to provide a motor control system for multi-phase brushless DC motor capable of handling high current without overloading H-bridges.

It is another object of the present invention to provide a motor control system that can switch back and forth between pulse width modulation and phase shift control to control the multi-phase brushless DC motor. Even when using the PWM to provide a motor control, input current to the motor is divided substantially equally among a plurality of H-bridges, thus not overloading them.

According to a first embodiment of the present invention, the motor control system controls a multi-phase winding motor having a plurality of phases. The motor control system has a position sensor for detecting the rotation of the multi-phase winding motor, a speed control device, such as a variable resistor, for controlling the speed of the multi-phase winding motor, a phase shift control circuit coupled to the position sensor. The phase shift control circuit has at least one phase winding driver generating a drive signal in response to the speed control device. The motor control system also has an anti-crossfire circuit responsive to the position sensor and the drive signal of the phase shift control circuit to output non-cross firing driver signals to a power driver driving windings corresponding to at least one phase of the multi-phase winding motor.

In addition to the above, the motor control system of claim further includes a speed encoder coupled to the phase shift control circuit to combine a signal from the position sensor and the drive signal from the phase shift control circuit.

The position sensor of the preferred embodiment of the motor control system preferably has two photo interrupters or two hall effect devices for each phase. Each of the photo interrupter is arranged separated by a predetermined shaft angle so that only one photo interrupter for the phase is enabled at a time.

The phase shift control circuit has the same number of the phase winding drivers as the plurality of phases of the multi-phase winding motor. Each phase winding driver has a differential amplifier generating the drive signal in response to a potential difference between a reference-input voltage and a variable input voltage. The variable input voltage is responsive to the speed control device. The reference input voltage corresponding to each phase winding driver is set to a predetermined value so that depending on the variable input voltage phase winding drivers are selectively enabled.

The phase shift control circuit further includes a speed control fault detector responsive to the speed control device. When the speed control device has an open circuit condition, a fault output of the speed control fault detector disables all of the phase winding drivers.

Moreover, the phase shift control circuit further includes a voltage follower coupled between the speed control fault detector and the phase winding drivers. The reference input voltage for each phase winding driver is provided by the voltage follower.

The motor control system also includes a phase shift starter circuit having a stop condition detector coupled to the position sensor and a pulse generator responsive to the phase shift control circuit. The stop condition detector detects the lack of move of the multi-phase winding motor and enables the pulse generator to generate pulse signals and outputs the pulse signals to the phase winding drivers. The pulse generator is coupled to the phase winding driver which is first enabled in response to the speed control device so that the pulse generator is triggered only when the phase shift control circuit is enabled.

The motor control system further includes a pulse width modulator coupled to the speed control device to output a pulse signal responsive to the speed control device to drive at least one power driver. A mode selector selects either the phase shift control circuit or the pulse width modulator.

The motor control system preferably includes a fault detection circuit coupled to a switch device for selecting one of signals outputted from the pulse width modulator and the phase shift control. The fault detection circuit has a voltage converter fault detector for checking an input voltage to the motor control system, a power source fault detector for checking an input voltage to the power driver, and a thermal fault detector for checking temperature of the multi-phase winding motor. The motor control system is disabled if the fault detection circuit detects a fault condition from at least one of the voltage converter fault detector, power source fault detector and thermal fault detector.

These and other aspects, features and advantages of the present invention will be better understood by studying the detailed description in conjunction with the drawings and the accompanying claims.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

The present invention is directed to a motor control system, which provides a plurality of H-bridges or power drivers for selectively controlling phase windings of a multi-phase brushless DC motor. In particular, the number of H-bridges matches the number of phase windings (each winding constitutes one phase) so that each H-bridge of the motor control system provides current to only one phase winding. For instance, a DC motor having 6 individual phase windings disposed symmetrically around the rotor preferably has 6 H-bridges, each bridge connected to one phase winding. Hence, the input of 60 amps into the motor will be evenly distributed among 6 H-bridges, each bridge easily handing about 10 amps.

The motor control system according to the preferred embodiment of the present invention is configured to select between a PWM mode and a phase shift mode or the combination of both. For example, in the phase shift mode, in response to the position of a variable resistor or potentiometer, more H-bridges are enabled thus more phase windings drive the rotor of the motor.

Figure 1:
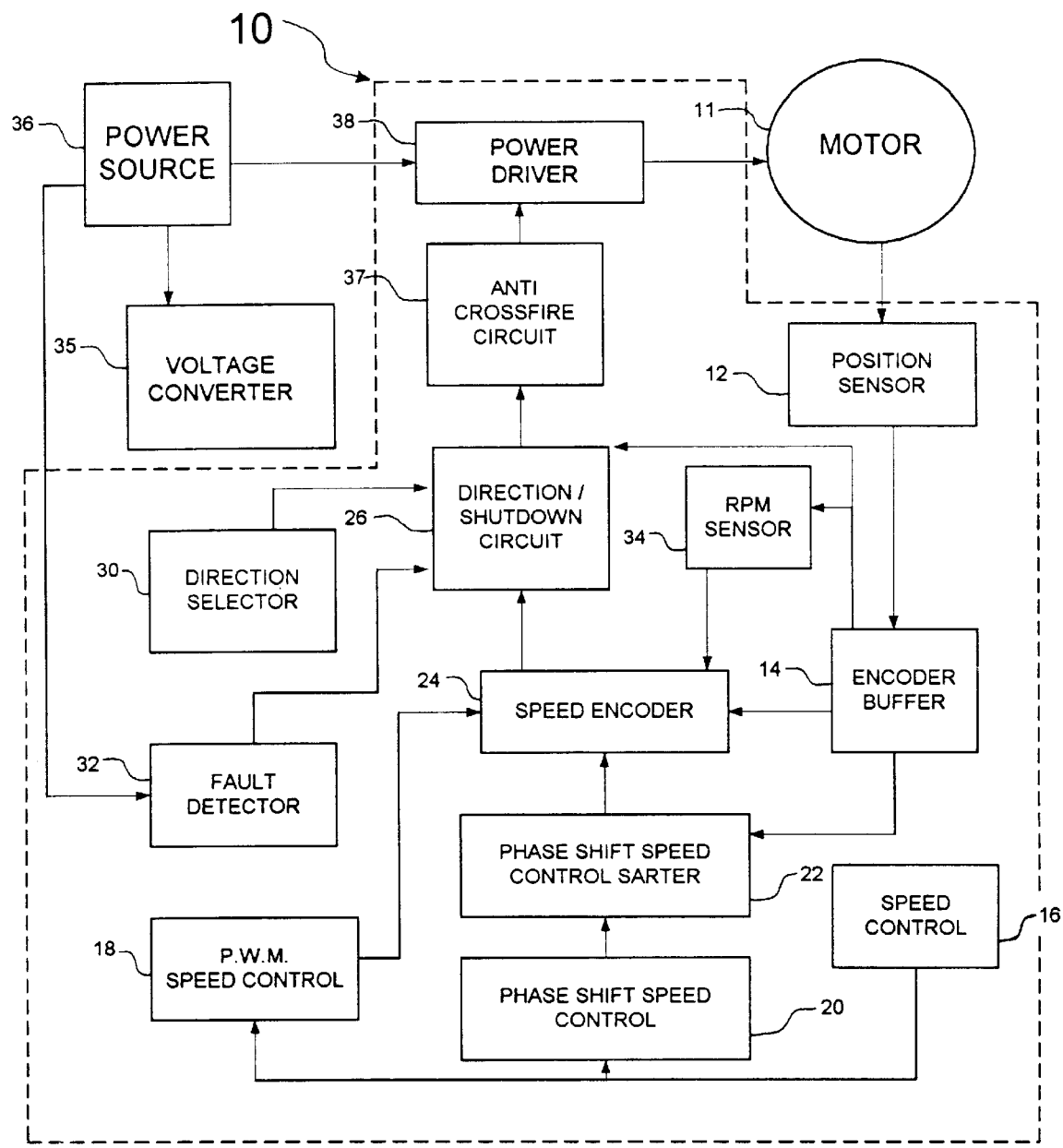
FIG. 1 illustrates a block diagram of the motor control system according to the preferred embodiment of the present invention.

FIG. 1 illustrates a block diagram of the motor control system of the present invention. In a preferred embodiment, the motor control system 10 has a position sensor 12, encoder buffer 14, speed control 16, PWM speed control 18, phase shift speed control 20, phase shift speed control starter 22, speed encoder 24, direction/shutdown circuit 26, anti-crossfire circuit 28, direction selector 30, fault detectors 32 and RPM sensor 34. The motor control system 10 receives a DC voltage from a power source 36 through a voltage converter 37. In particular, a power driver 38 is connected between the power source 36 and a motor 11 and regulates power supplied to the phase windings of the motor 11. In the preferred embodiment of the present invention, the power source 36 for the system can be either a battery source, AC to DC converter, or regulator. The voltage converter 37 converts a higher input voltage from the power source 36, such as 37 Vdc, to a lower voltage, such as 12 Vdc, and provides the converted voltage to the main logic of the motor control system 10.

A brief summary of the function of each block diagram is described below. According to the present invention, the motor 11 is preferably a multi-phase bipolar parallel winding brushless DC motor. It should be noted that for purposes of describing the present invention, the following description will be made with reference to a 6 phase brushless DC motor.

The position sensor 12 generates a signal that provides the relative position of the rotor to enable the motor control system 10 to provide a proper excitation to the motor. The encoder buffer 14 buffers and inverts the analog signals from the position sensor 12 and outputs digital signals.

The speed control 16 provides a speed control of the motor 11. The PWM speed control 18 provides the control of the motor speed via pulse width modulation method. Also controlling the speed of the motor 11 is with a phase shift method. The phase shift speed control 20 receives a speed control signal and controls the motor speed. Output from the phase shift speed control 20 is inputted to the phase shift speed control starter 22 which provides a method to start the motor when a phase shift speed control 20 is enabled but the rotor is not rotating.

The speed encoder 24 receives the signals from the PWM speed control 18, the phase shift speed control 20 and the signals from the encoder buffer 14 and routes proper signals to the motor 11. The speed encoder 24 also provides a closed loop for constant speed mode of motor operation. By sensing the frequency of the signals from the encoder buffer and compensating as necessary to maintain a constant frequency, thus maintaining a constant speed.

The fault detector 32 monitors the motor control system 10 for various fault conditions and shuts down the motor 11 upon detection of any fault condition. The direction/shutdown circuit 26 is connected to the direction selector 30 and switches the motor control system 10 between forward, reverse & neutral modes and provides a means to shutdown the system. The anti-crossfire circuit 28 prevents the cross firing of the power drivers. The RPM sensor 34 senses the motor speed to control the motor torque at various speeds. The voltage converter 37 receives power from the power source 36 and generates various voltages to drive the circuits of the motor control system 10.

Figure 2:
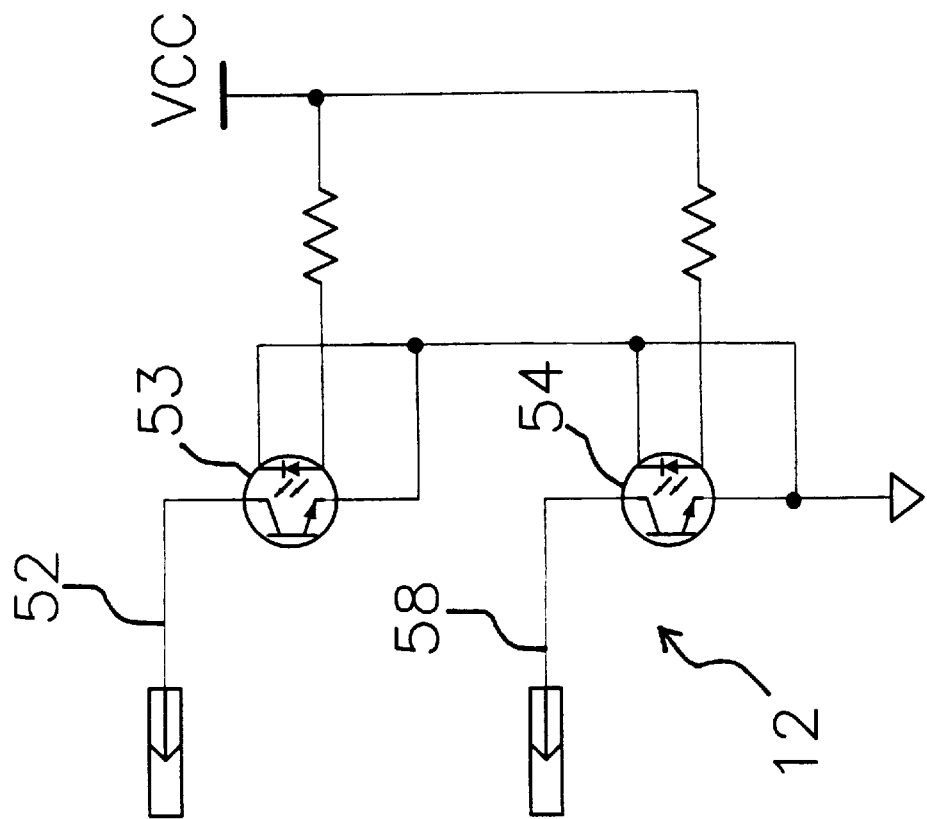
FIG. 2 illustrates a position sensor.

FIG. 2 illustrates a position sensor 12 of the preferred embodiment of the motor control system 10. Preferably, there are two optointerrupters 53 and 54 or photo interrupters for each phase of the stator winding of the brushless DC motor 11. For instance, a motor having six phase windings in a stator, there are total of twelve optointerrupters. For simplicity of explanation, only one position sensor 12 corresponding to one phase winding of the motor is shown in FIG. 2. Alternative to the photo interrupters, hall effect devices may also be used.

The brushless DC motor 11 has a rotor having permanent magnets having a number of poles. Securely fixed on the end of a rotor shaft of the motor is a speed encoder in the form of a disk (not shown). The encoding disk has a plurality of light penetrating openings, which are spaced and disposed at the circumferential edge portion thereof so as to position with respect to optointerrupters 53 and 54. The encoder disk interrupts the light path of the optointerrupters 53 and 54, thus causing the transistors of the optointerrupters 53 and 54 to turn on and off, generating output signals 52 and 58 at the respective collectors (output). Preferably, the optointerrupters 53 and 54 corresponding to one phase winding are placed so that they are separated by approximately 60 degrees. When the encoding disk rotates so that one light penetrating opening of the encoding disk is disposed between the optointerruptor 53, the transistor of the optointerruptor 53 turns on and pulls the collector voltage at the output 52 to a low level, such as ground.

Figure 3:
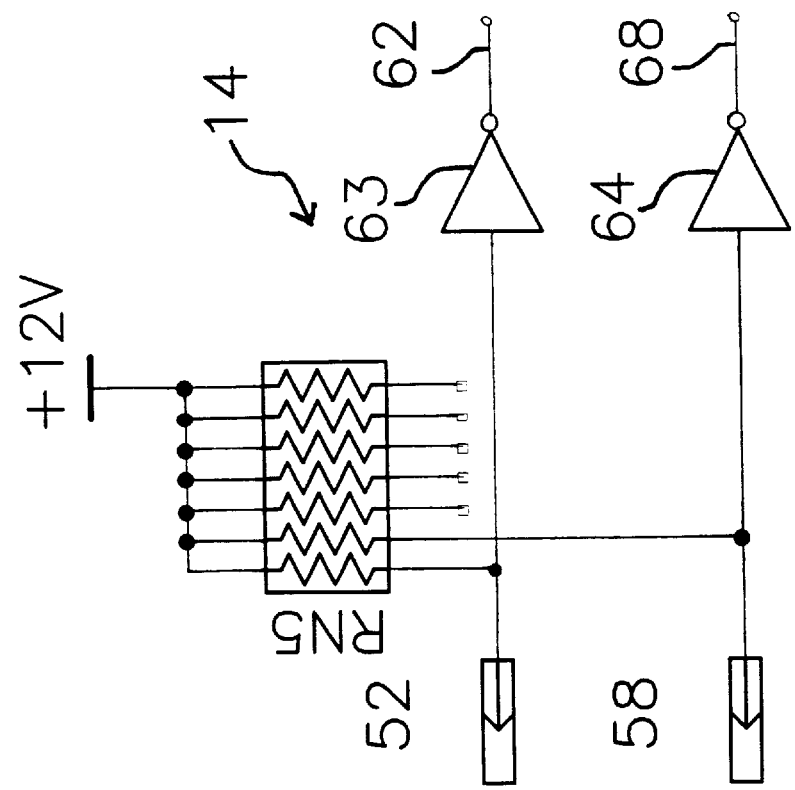
FIG. 3 illustrates an encoder buffer.

FIG. 3 illustrates an encoder buffer 14 coupled to the position sensor 12 of FIG. 2. Each buffer is connected to an output of an optointerruptor. Thus, for each phase winding of the brushless DC motor, there is one encoder buffer 14, which consists two invertors 63 and 64. For instance, a motor having six phase windings in a stator, there are total of six encoder buffer or twelve invertors. For simplicity of explanation, only one encoder buffer corresponding to one phase winding of the motor is shown in FIG. 3.

The signals 52 and 58 from the optointerrupters 53 and 54, respectively, of the position sensor 12 are provided to the encoder buffer 14. The encoder buffer 14 converts analog signals from the optointerrupters 53 and 54 to digital logic signals by inverting the input signals 52 and 58. For example, when the optointerruptor 53 transistor is on, the signal 52 is pulled to a low level. An inverter 63 buffers and inverts the input signal and outputs a logical one signal at node 62. The inverter 63 is preferably of a Schmitt trigger type for enhanced switching speed.

Figure 4:
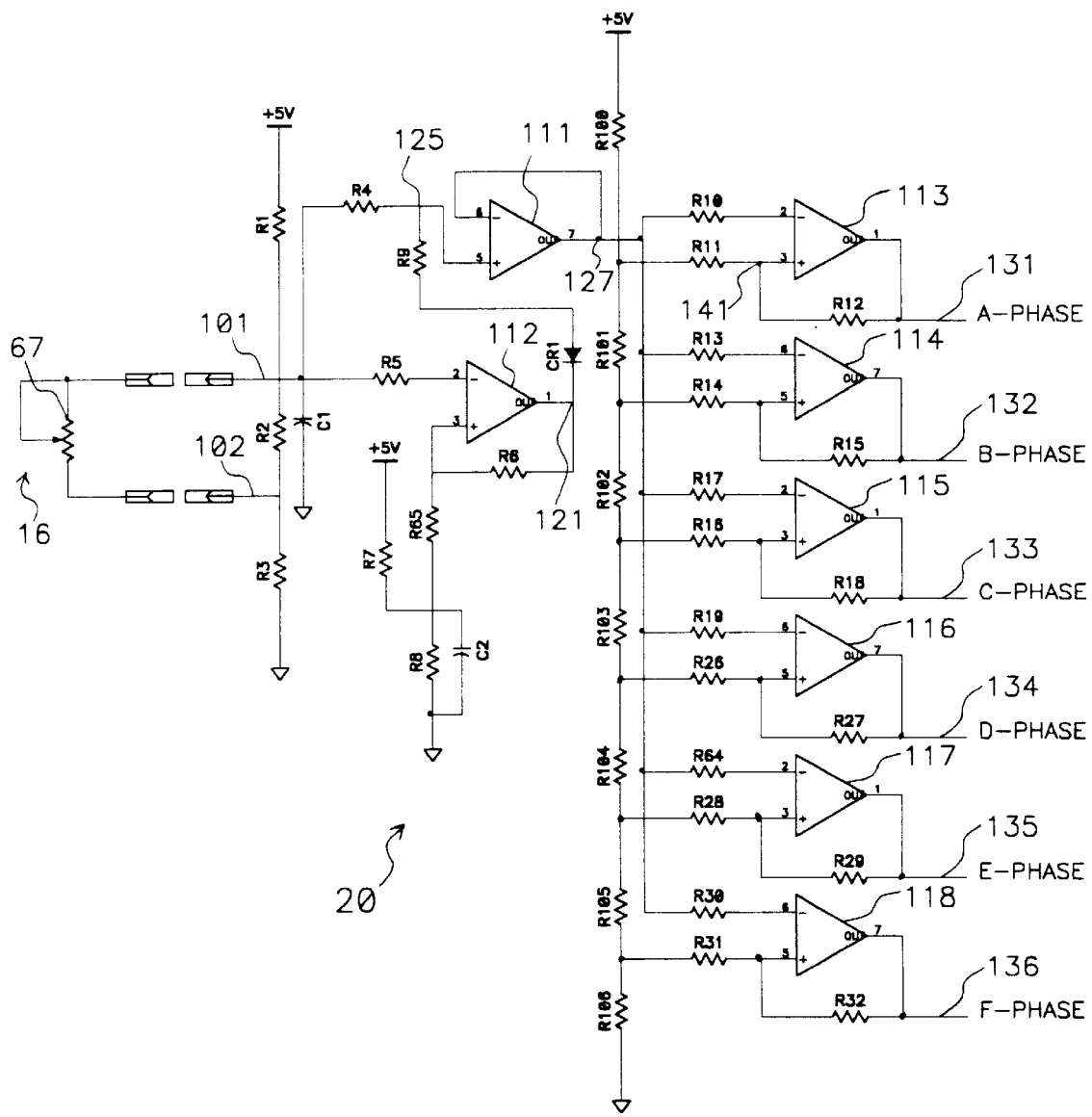
FIG. 4 illustrates a phase shift speed control.

FIG. 4 illustrates a phase shift speed control 20 of the motor control system 10. The output signal from the speed control 16 is provided to inputs 101 and 102. The speed control 16 is preferably a variable resistor or potentiometer 67 for controlling resistance. When the motor control system 10 is used in a battery-operated vehicle, such as a golf cart, the potentiometer 67 is coupled to the accelerator pedal of the vehicle so that the amount of depression of the pedal controls the output resistance of the potentiometer 67. The input signals 101 and 102 are sensed by a differential amplifier 112, which detects a fault condition of the speed control 16. If the potentiometer 67 in the speed control 16 is in a fault or "open" condition, the output node 121 of the differential amplifier 112 is pulled down to a low voltage level, thus pulling down the voltage at input node 125 of a voltage follower 111. As a result, the output 127 of the voltage follower 111 is at a low voltage level which in effect stops the motor 11 by turning off the power driver 38 which provides power to the winding of the motor 11.

Under the normal operating condition, the voltage follower 111 buffers the potentiometer signal output from the differential amplifier 112 and feeds it to the phase control section comprising differential amplifiers 113–118, as shown in FIG. 4. As the voltage level at the output node 127 of the voltage follower 111 increases, the six differential amplifiers 113–118 connected to voltage divider resistors are turned on in a sequential order. Each one of the differential amplifiers 113–118 drives one phase winding of the motor 11. For example, the differential amplifier 113 provides an output signal to drive A-phase winding of the stator, while the differential amplifier 118 provides an output signal to drive F-phase winding.

By selectively enabling the differential amplifiers 113–118, the various phase windings of the stator may be selectably enabled. Energizing additional phase windings increases the rotor rotation speed and torque. Output signals 131–136 of the differential amplifiers 113–118, respectively, are provided to speed encoder 24 (shown in FIG. 1—main diagram), which form the encoded speed signal.

For example, the differential amplifier 113 driving the A-phase winding of the stator of the motor 11 is enabled when the output voltage at node 127 of the voltage follower 111 reaches approximately 0.75V. This is achieved by selecting the value of resistor R11 to provide 0.75V to input 141 of the differential amplifier 113. Similarly, the differential amplifier 114 driving the B-phase winding of the stator turns on when the output voltage at node 127 of the voltage follower 111 reaches approximately 1.25V. The differential amplifier 115 for C-phase turns on when the output voltage at node 127 reaches approximately 2.0V. Successive enabling of the phase differential amplifiers 116–118 continue until all of the phase windings are turned on.

Alternatively, the differential amplifiers 113–118 may be arranged so that the order of phase winding enablement is altered, for example, in a sequence of A-phase, C-phase, E-phase, B-phase, D-phase and finally F-phase. It is also possible to use one differential amplifier 113 to drive more than one phase winding.

Figure 5:
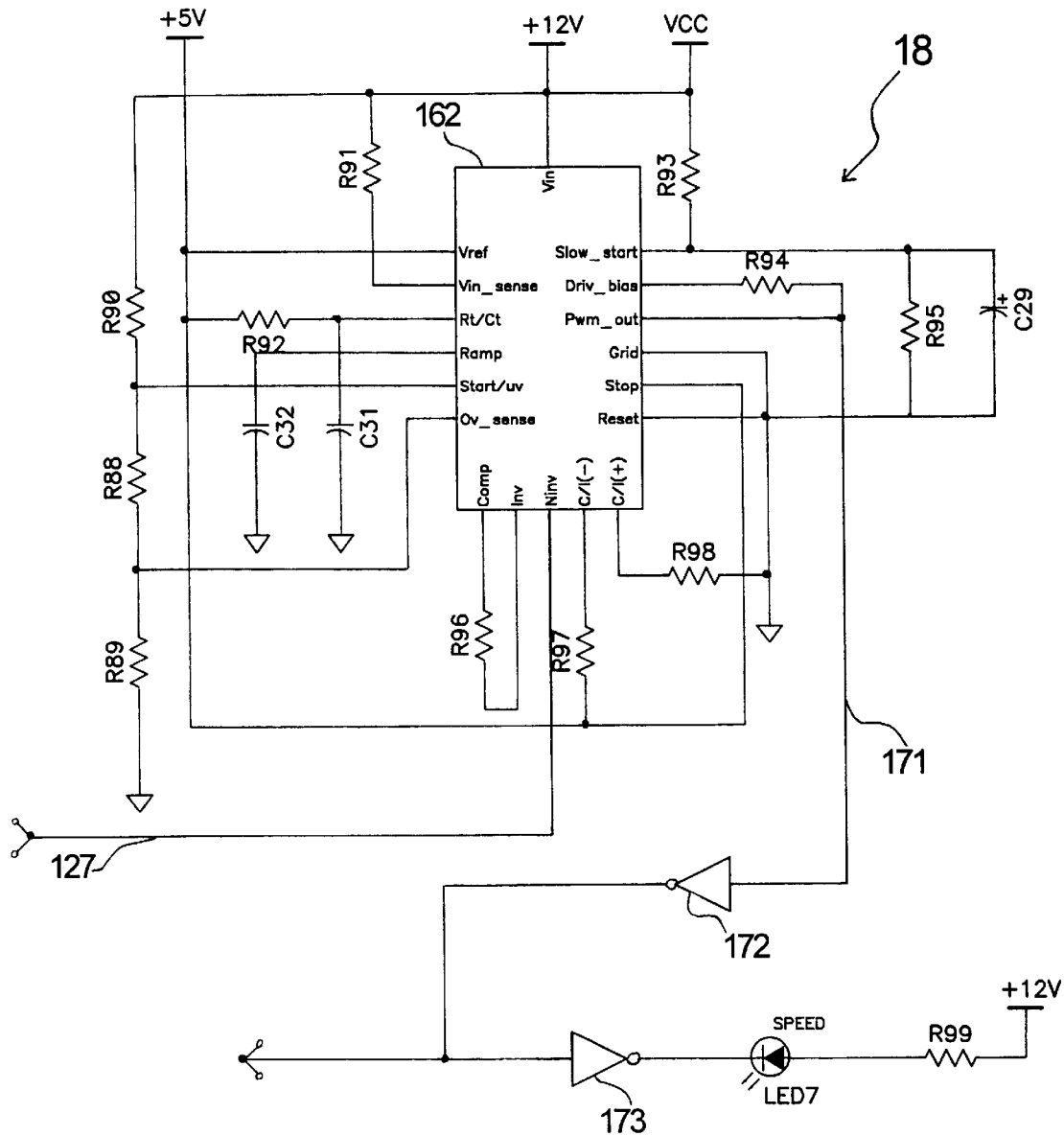
FIG. 5 illustrates a PWM speed control.

FIG. 5 illustrates a PWM speed control 18 of the motor control system 10. Inputs to the PWM speed control 18 is the same as the input to the differential amplifiers 113–118 of the phase shift control 20, which is the output 127 of the voltage follower 111 shown in FIG. 4. The output 127 of the voltage follower 111 is also connected to a PWM controller 162. Suitable PWM controller 162 includes Uc3840N manufactured by Unitrode. When the potentiometer is in a fault or "open" condition, the differential amplifier 112 detects such condition and controls the output signal 121. The output signal 121 is provided to the PWM controller 162 through a voltage follower 111 to make the output node 171 of the PWM controller 162 to shutdown. Under the normal operating condition, the voltage follower 111 buffers the potentiometer signal from speed control 16 and outputs it to the PWM controller 162, which produces a pulse width modulation. The output 171 of the PWM controller 162 is provided to a buffer/inverter 172, output of which is then provided to the speed encoder 24 shown in FIG. 1. The output 171 of the PWM controller 162 is also provided to inverter 173 to enable a speed indicating light emitting diode LED1.

Figure 6:
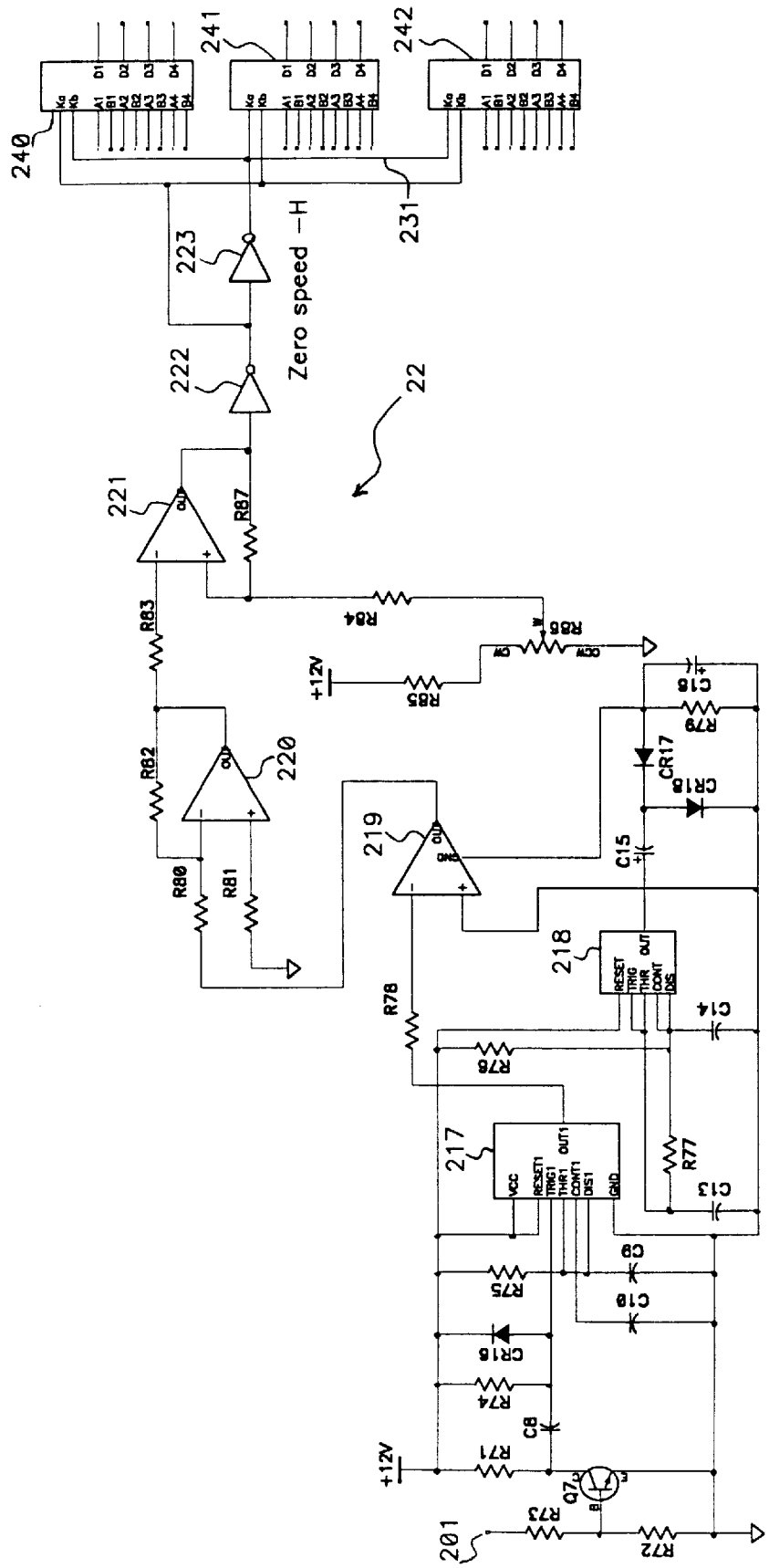
FIG. 6 illustrates a phase shift speed control starter.
Figure 7:
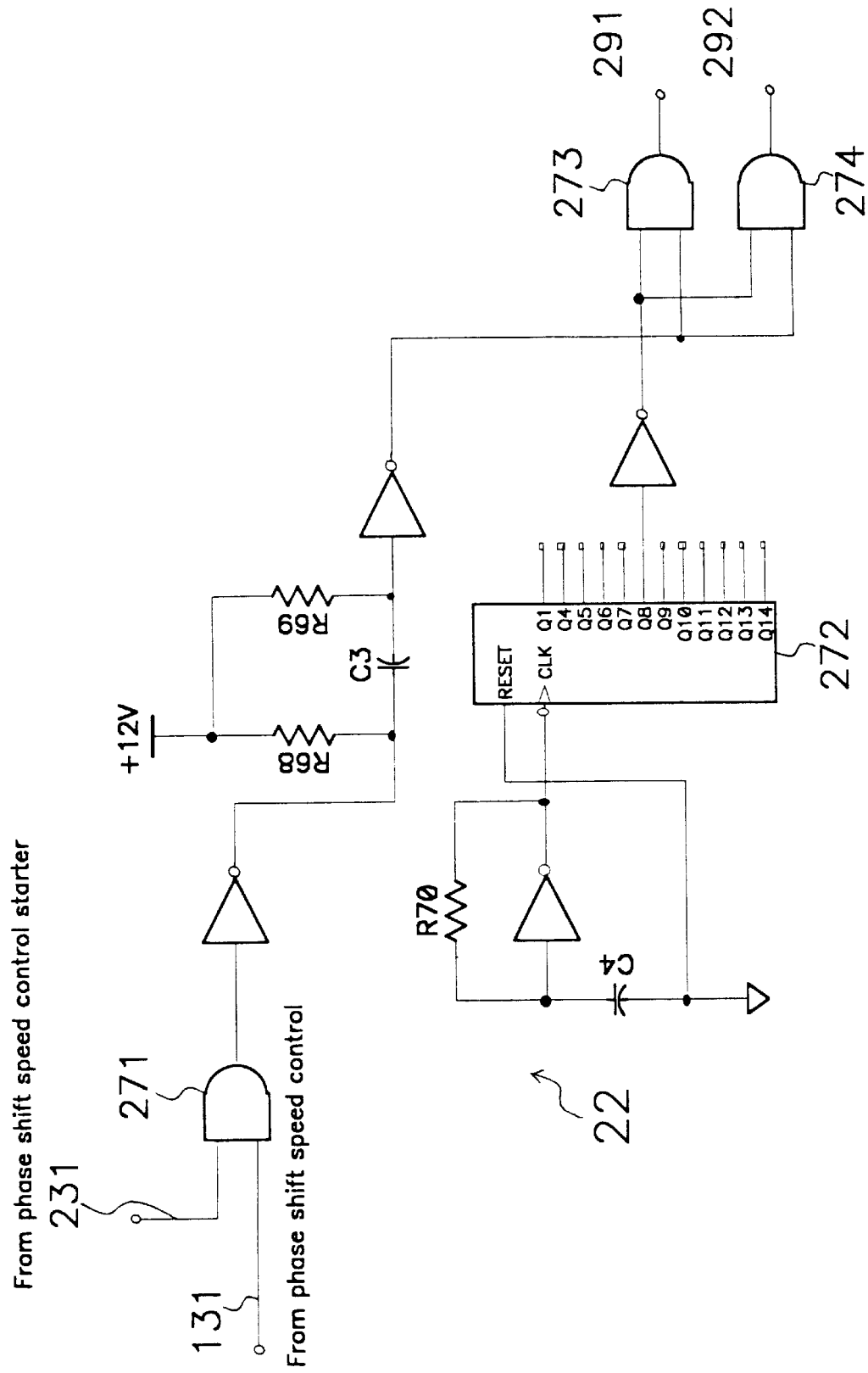
FIG. 7 illustrates a pulse generator.

FIG. 6 illustrates a phase shift speed control starter 22 for detecting the running condition of the motor 11 by detecting the signal at R73, which is connected to an optointerruptor of the position sensor 12. The phase shift speed control starter 22 is largely divided into two parts: stop condition detector, which is shown in FIG. 6, and a pulse generator that is shown in FIG. 7. The phase shift speed control starter 22 is enabled only when the motor 11 is in the phase shift speed control mode and not in the PWM mode. The purpose of the phase shift speed control starter 22 is to kick-start the motor 11 when the motor 11 is not rotating by providing, preferably, a pulse signal to the power driver 38 (shown in FIG. 1).

A logical high at the input 201 of the phase shift speed control starter 22, which signifies that the rotor is not rotating, enables the circuits which provides a logical high signal to one of the inputs of the quad and/or select gate 240–242 (for brevity, hereinafter referred to as "quad gate"), which selects and outputs signals provided at respective B1–B4. For example, when a logical high is provided to Ka of the quad gate 240, all of the signals provided to input nodes A1–A4 are outputted to D1–D4. Conversely, when a logical high is provided to Kb of quad gate 240, all of the signals provided to input nodes B1–B4 are outputted to D1–D4. When signals to both Ka and Kb are either logical high or logical low, then no input signal is provided to the outputs D1–D4. The quad gate, 240–242 in the phase shift speed control starter 22 is used to select either start or normal run mode. The switching is controlled by output signals from the invertors 222 and 223 of the phase shift speed control starter 22. The combined operation of chips 217, 218, 219, 220 and 221 sense the frequency of the signal at node 201. When the signal is below the frequency determined by the setting of R86 the output of 221 goes low, which makes the output of 222 to go high, turning on Kb. By the output of 222 going high, this makes the output of 223 to go low, turning off Ka. When the motor speed is normal, the frequency is high enough to make the output of 221 to go high, which makes the output of 222 to go low, turning off Kb. By the output of 222 going low, this makes the output of 223 to go high, turning on Ka, thus returning the motor control system 10 to normal operation.

Working in conjunction with the phase shift speed control starter 22 is the circuit in FIG. 7 which generates a pulsed starting signal by detecting the input signals 131 and 231 at AND logic gate 271. The input signal 131 is provided from the phase shift speed control 20 and the input signal 231 is provided from the phase shift speed control starter 22. The outputs 291 and 292 of the phase shift speed control starter 22 are enabled only when both input signals 131 and 231 are in a logical high level.

Figure 16:
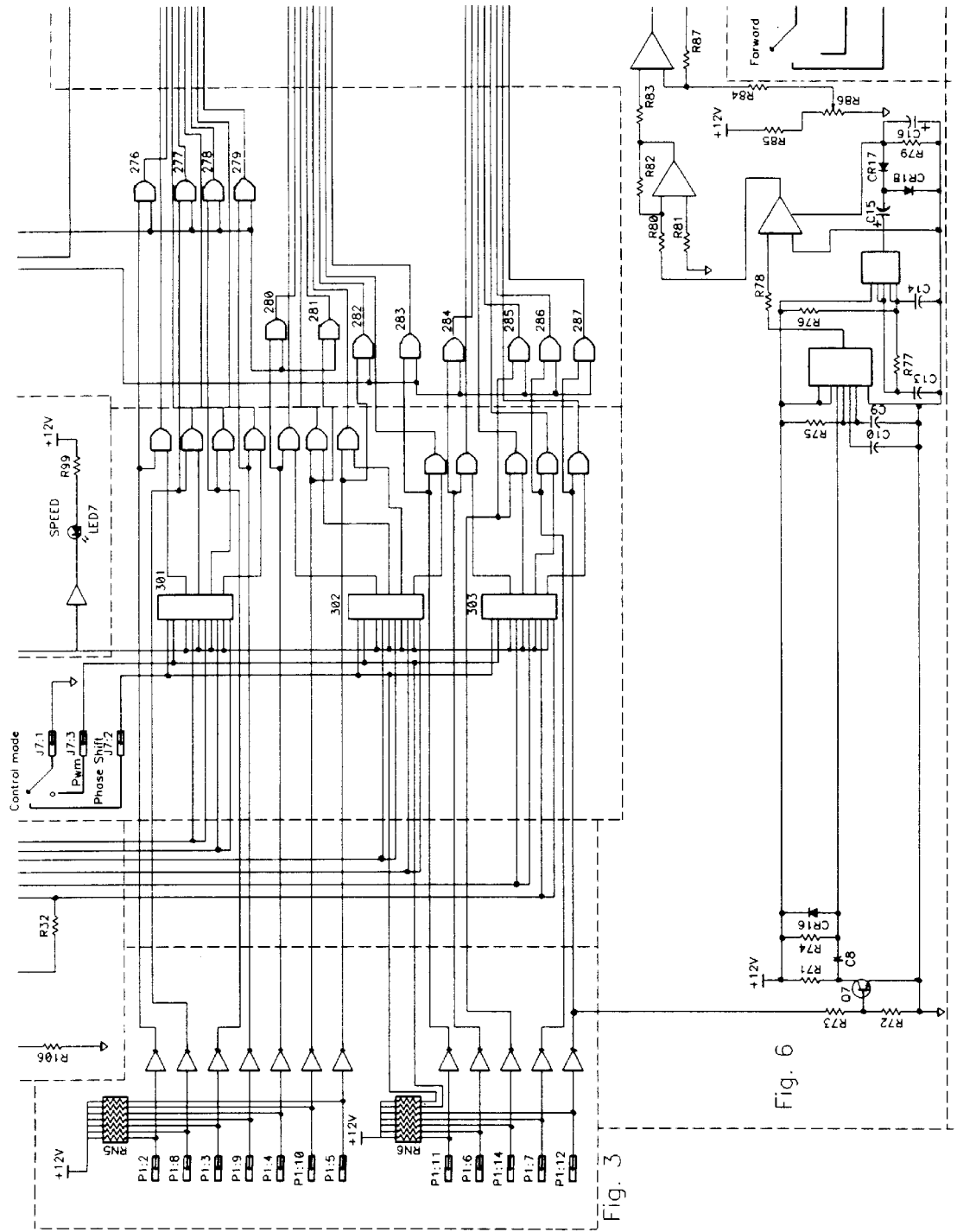

A pulse is generated by a counter 272 in every predetermined period and is provided to AND gates 273 and 274. The output signals 291 and 292 are then provided to AND gates 276–287 (shown in FIG. 16) which also receive signals from the position sensors 12. The pulsed starting signals from output 291 and 293 are combined with the buffered encoder signal by AND gates 276–287, and are provided to the motor 11. The pulsed starting signal passes through quad gate, 240–242 and are provided to the power driver 38 which in turn drives the motor 11.

The speed encoder 24 which is shown in FIG. 1 includes quad gate 301–303 (shown in FIG. 16) receiving inputs from both PWM speed control 18 and phase shift speed control 20 and outputs one in response to a control mode selector which selects between PWM mode and phase shift mode. The output of the quad gate 301–303 are provided to the AND gates 276–287 which also receives inputs from the position sensor 12. In particular, the speed encoder 24 combines the signal from position sensor 12, via encoder buffer 14, with either the signal from the PWM speed control 18 or the phase shift control 20 or a combination of the two signals, and outputs encoded speed signal. The encoded speed signal is then provided to the anti-crossfire circuit 28. The speed encoder 24 may also be used to sense the speed of the motor and for torque optimization.

Figure 8:
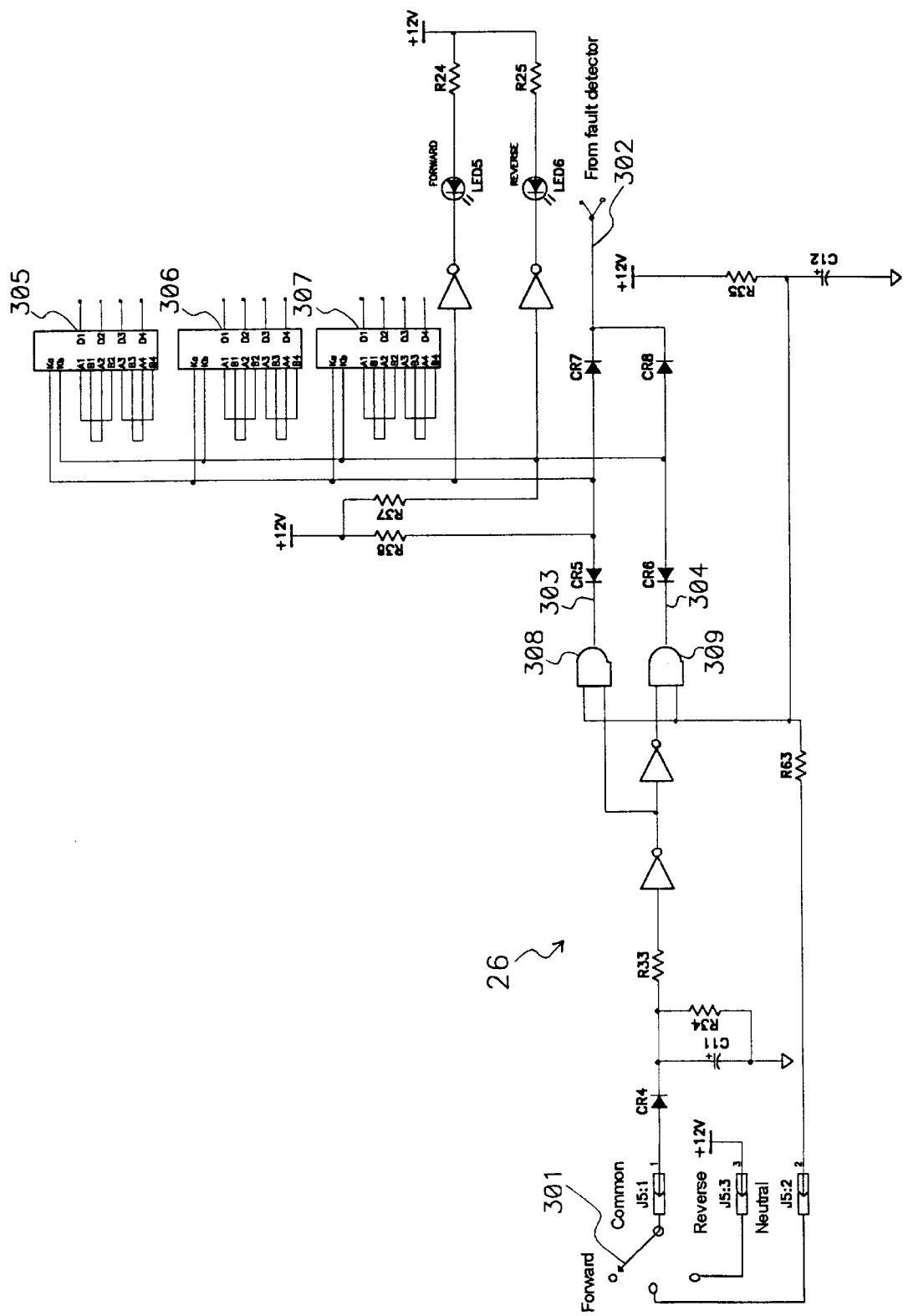
FIG. 8 illustrates a direction/shutdown circuit.

FIG. 8 illustrates a direction/shutdown circuit 26 which responses to a selector switch 301 for selecting the rotation direction of the motor 11. Depending on the position of the selector switch 301, the quad gate 305–307 (also shown in FIG. 17) will direct different inputs to the output. In addition, the direction/shutdown circuit 26 responses to a signal at node 302 which is an output from a fault detector 32. For example, when the selector switch 301 is set to forward position, the output 303 of the AND gate 308 is set to a logical high and the output 304 of the AND gate 309 is set to a logical low. This logical combination enables the quad gate 305–307 to select Ka which outputs the inputs connected to input nodes A1–A4. Conversely, when the selector switch 301 is set to reverse position, the output 303 of the AND gate 308 is set to a logical low and the output 304 of the AND gate 309 is set to a logical high. This logical combination enables the quad gate 305–307 to select Kb which outputs the inputs connected to input nodes B1–B4. The selection of neutral position disables both Ka and Kb, thus causing the quad gate 305–307 to output no signals.

When the input 302 is held to a logical low, which signifies the existence of a fault condition in the motor control system 10, both Ka and Kb of the quad gate 305–307 are disabled, thus causing the quad gate 305–307 to output no signals.

Figure 9:
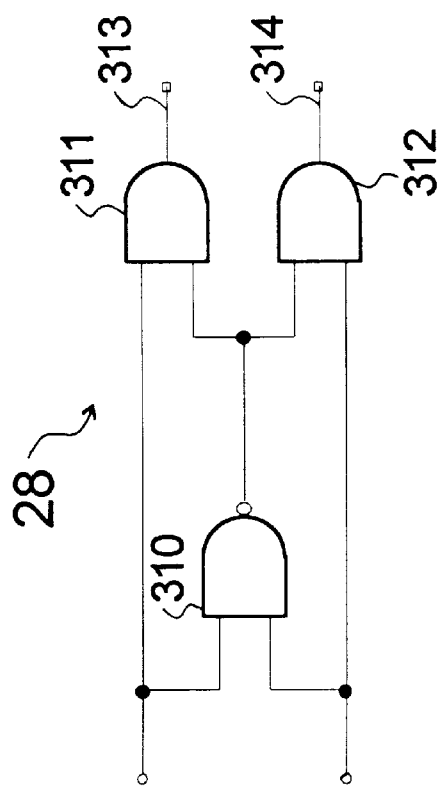
FIG. 9 illustrates an anti-crossfire circuit.

FIG. 9 illustrates the anti-crossfire circuit 28, which prevents the cross firing of the power driver 38. The crossfire condition may cause the power devices, such as transistors, to fail in the power driver 38. The NAND gate 310 senses whether both of its inputs, which are encoded signals, are at a logical high, which constitutes a crossfire condition. If such condition exists, NAND gate 310 outputs a logical low to AND gates 311 and 312 which in effect outputs a logical low at outputs 313 and 314, respectively, disabling the power driver 38. The anti-crossfire circuit 28 is also preferably the final logic section before the power driver 38.

Preferably, there is one anti-crossfire circuit 28 for each phase winding of the stator of the brushless DC motor 11. For instance, a motor having six phase windings in a stator has 6 anti-crossfire circuits 28. For simplicity of explanation, only one anti-crossfire circuit 28 corresponding to one phase winding of the motor 11 is shown in FIG. 9.

Figure 10:
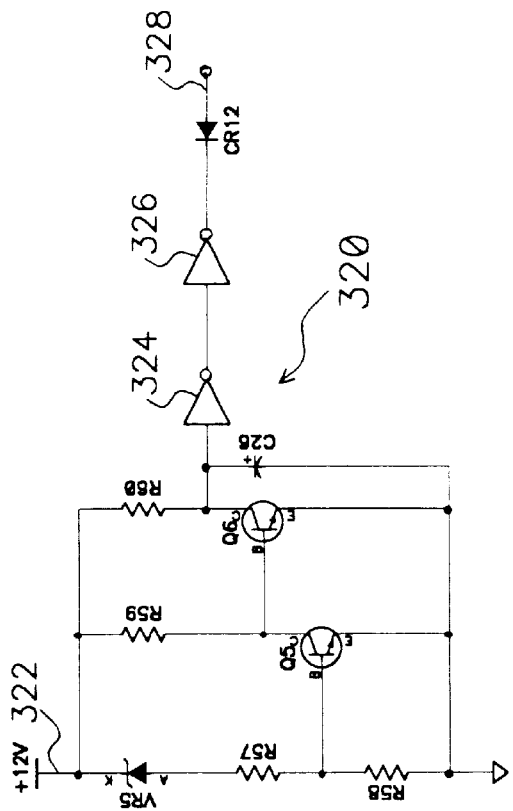
FIG. 10 illustrates a voltage converter fault detection circuit.
Figure 11:
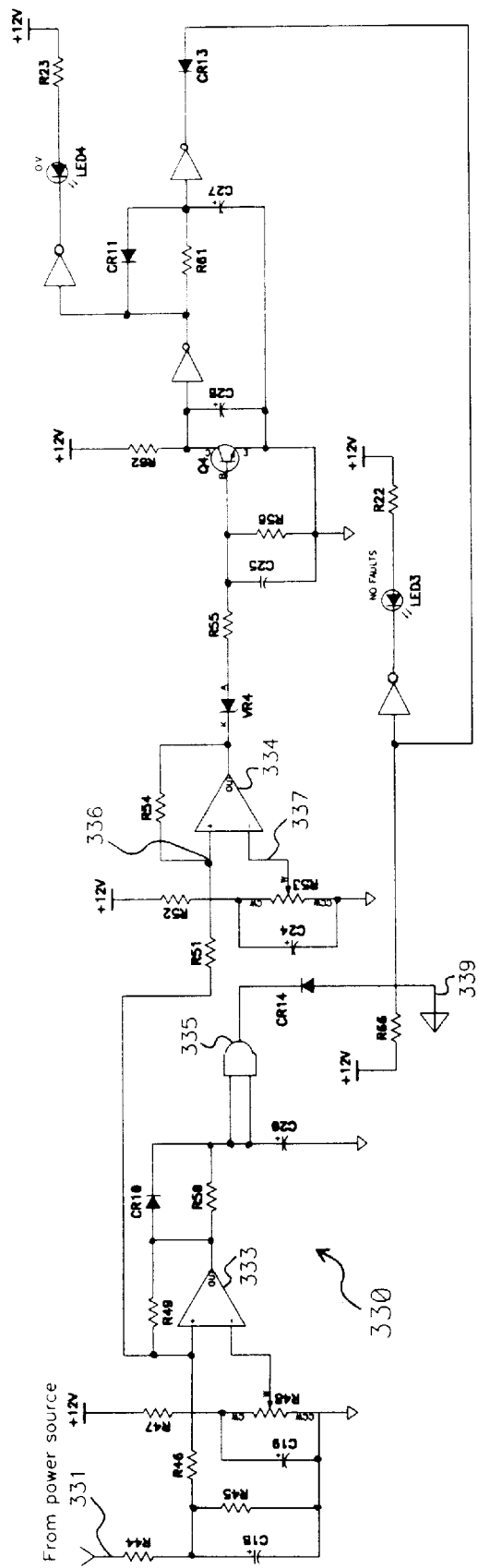
FIG. 11 illustrates a power source fault detection circuit.
Figure 12:
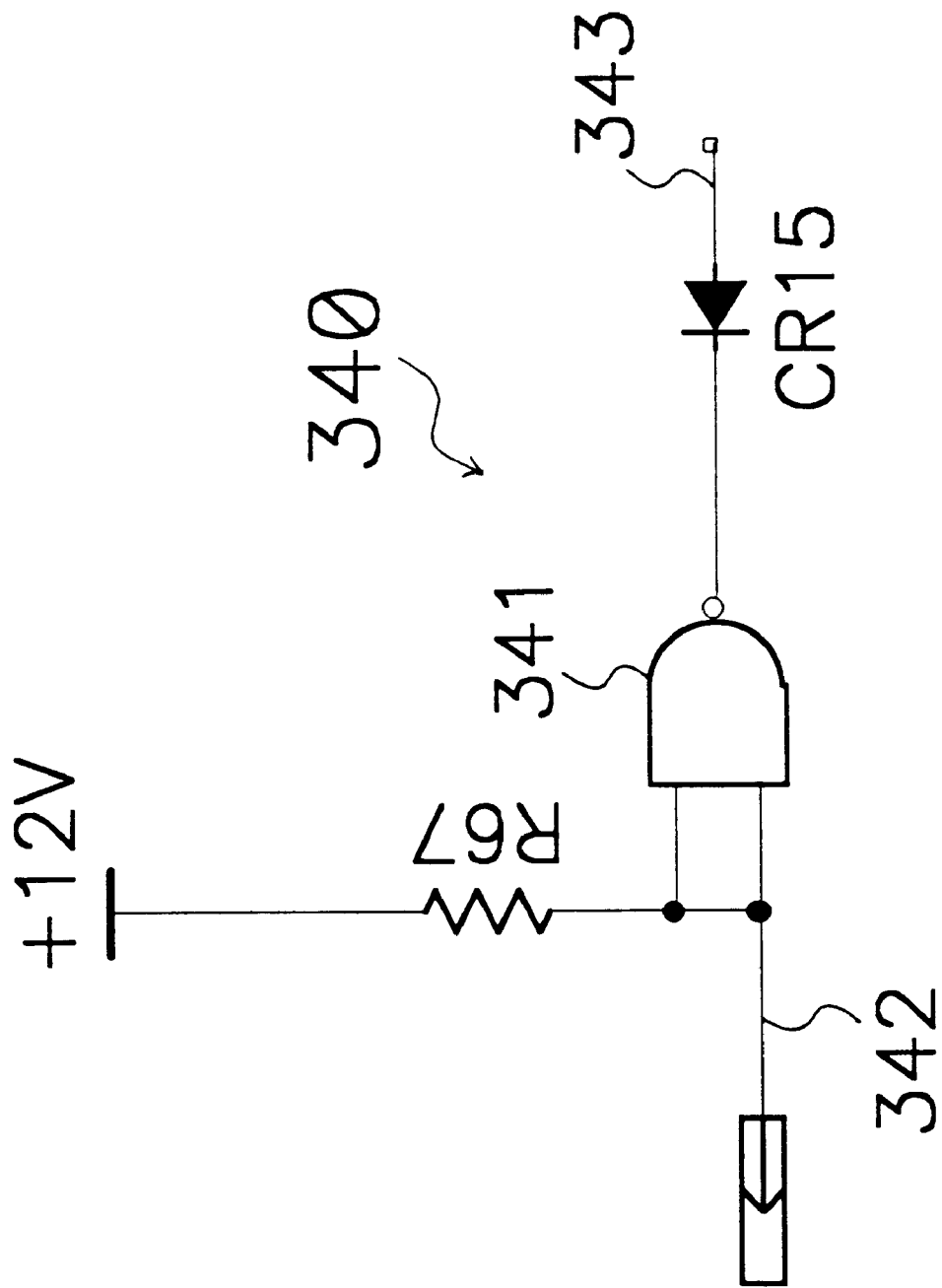
FIG. 12 illustrates a thermal fault detection circuit.

FIGS. 10–12 illustrate circuits for detecting fault conditions in the motor control system 10. In particular, FIG. 10 is a voltage converter fault detection circuit 320 which controls the quad gate 305–307 (shown in FIG. 17) to produce no output signals that drive the phase windings of the motor when the output of the voltage converter 37, which is preferably 12 Vdc, falls below a preset level. When the logic power supply at node 322 falls below a predetermined level, Q5 is turned off, which in turn turns on Q6 because Q5 is no longer holding the base of Q6 low. The collector of Q6 goes low so that the output of 324 is high and switches the output of inverter 326 from high to low. Through CR12, the output 328 is changed to a logical low. The output 328 is connected to the node 302 of the direction/shutdown circuit 26 in FIG. 8. The level at which Q5 turns off is determined by the value of VR5. According to a preferred embodiment, the shutdown voltage is approximately 10.8 Vdc.

FIG. 11 illustrates a power source fault detection circuit 330 which controls the quad gate 305–307 to produce no output signals that drive the phase windings of the motor when the input voltage at node 331 from the power source 36 is either above or below a preset level. The potentiometer R48 controls the lower threshold voltage, while potentiometer R43 controls the upper threshold voltage. For example, if the input voltage falls below the threshold voltage set by R48, the output of the differential amplifier 333 is pulled low, thus the output of AND gate 335 falls low. Similar to the circuit in FIG. 10, the anode 339 of CR14 is set at a low level signifying a fault condition.

The differential amplifier 334 is used for detecting whether the input voltage at node 336 has exceeded the high threshold voltage level set by the setting of potentiometer R53. When the voltage level at node 334 is beyond that of node 337, the differential amplifier 334 trips, thus shutting down the motor control system 10.

In the preferred embodiment, the voltage converter 37 converts the input voltage from a power source 36 (shown in FIG. 1) to 12 Vdc which can be used to power the rest of the motor control system 10. When the present invention is used in a motorized vehicle, such as a golf cart, the input voltage from the power source 36 is 36 Vdc.

The circuit in FIG. 12 is a thermal fault detection circuit 340. The inputs to the NAND gate 341 is connected to a thermal sensor switch (not shown) which is normally in a closed position. If the thermal sensor switch, preferably mounted on a heatsink coupled to the motor control system and/or the motor, detects a temperature condition exceeding a preset threshold temperature, the thermal sensor switch opens which pulls the output of the NAND gate 341 to a logical low. The output 343 of the thermal fault detection circuit 340, which is connected to the input node 302 of the direction/shutdown circuit 26 I FIG. 8, is then set to a logical low.

The voltage converter fault detection circuit 320, power source fault detection circuit 330 and thermal fault detection circuit 340 constitutes the fault detector 32 shown in FIG. 1. If any one of the circuits in FIGS. 10–12 causes a fault condition, the direction/shutdown circuit 26, through CR7 and CR8, pulls the signals provided to Ka and Kb of 305–307 to a logical low, disabling the outputs. This causes the motor 11 to turn off.

Figure 13:
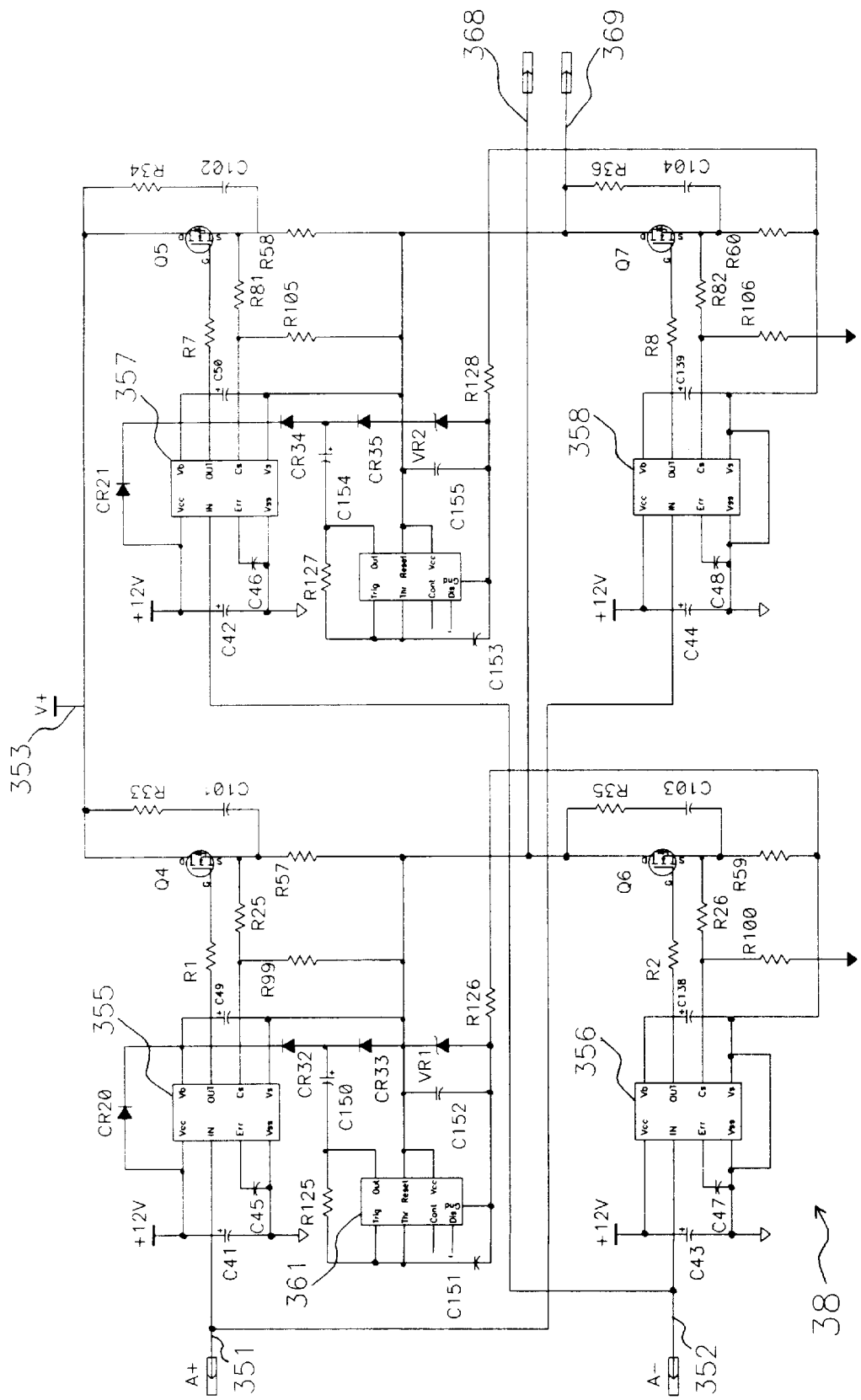
FIG. 13 illustrates a power driver.

FIG. 13 illustrates the power driver 38 of the motor control system 10 which drives the motor 11 in response to the control signals from the anti-crossfire control 28. The power driver 38 is also referred to as a "H-bridge." The power driver 38 has a multiple H-bridges, which receives power from the power source 36 and the signal from the anti-crossfire 28. The power driver 38 provides bipolar current to the motor winding sections in the motor 11, particularly to the proper winding section of the motor 11 in the proper polarity at the proper time. The number of H-bridges in the power driver 38 depends on the number of phase windings in the motor 11. The power driver 38 also provides current limiting capabilities.

Figure 17:
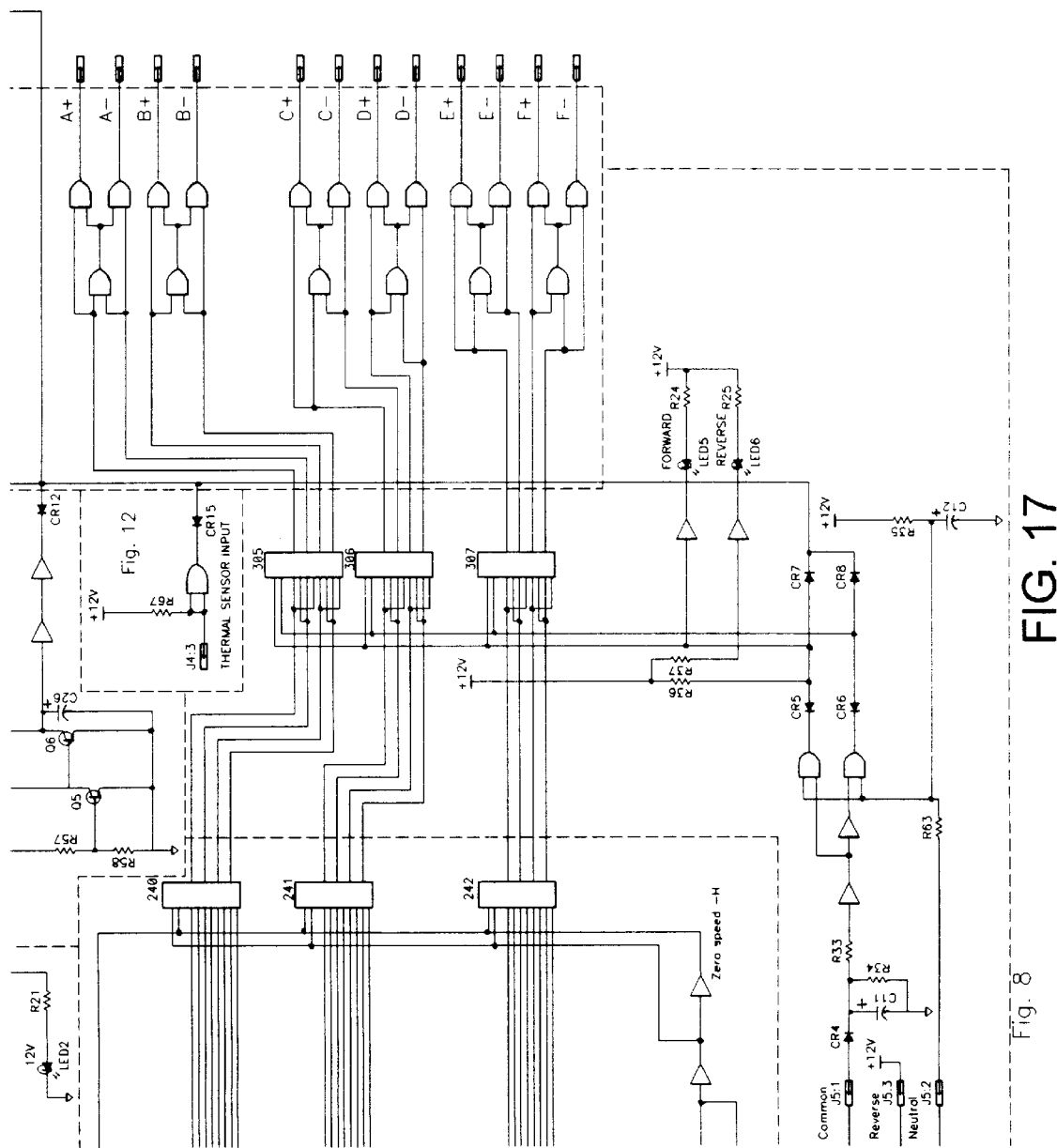

In FIG. 13 the signals A+ and A− at nodes 351 and 352, respectively, are provided from the main logic 13, and in particular, from the anti-crossfire circuit 28 (better shown in FIG. 17). As the signals A+ and A− are provided to the stator windings in a controlled manner, the motor 11 rotates. For example, during a normal operating condition, a logical high is provided to A+ input of the power driver 38. The logical high turns on transistors Q4 and Q7 through current limiting gate drivers 355 and 358, respectively.

As a result, voltage and current from the power source 36 at node 353 is provided to the phase winding coupled to this particular power driver 38 at a proper time in response to the motor position sensor 12. Thereafter, the signal to A+ is turned off and A− is turned on. The logical high at A− turns on transistors Q5 and Q6 through 357 and 356, respectively. As a result, voltage and current from the power source 36 at node 353 is provided to a stator winding coupled to this particular power driver 38 or H-bridge at proper time in response to the motor position sensor 12. Suitable current limiting gate drivers 355 and 358 include IR2125 and IR2121, respectively, manufactured by International Rectifier.

Figure 14:
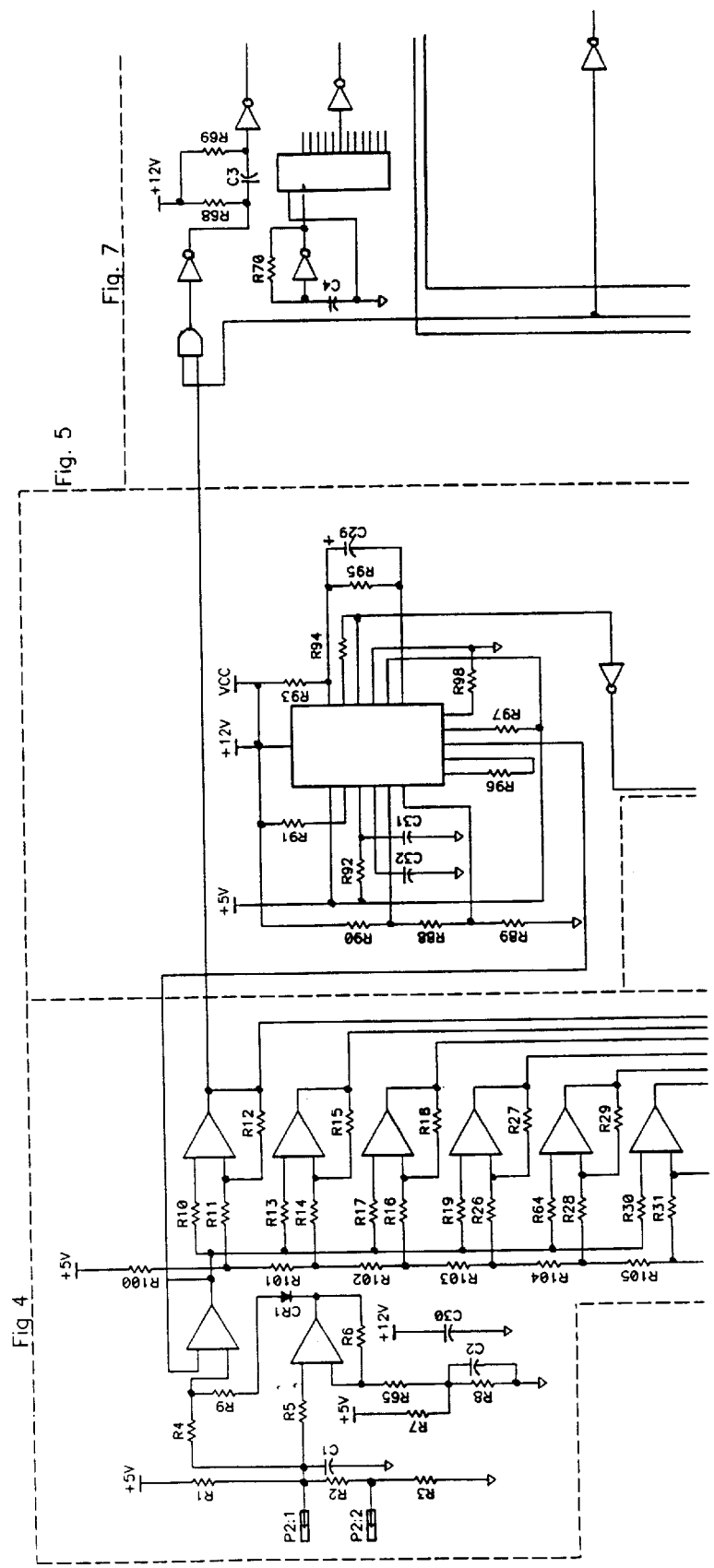
FIGS. 14–17, when arranged as shown in FIG. 18, illustrates a schematic diagram of the motor control system according to present invention.
Figure 15:
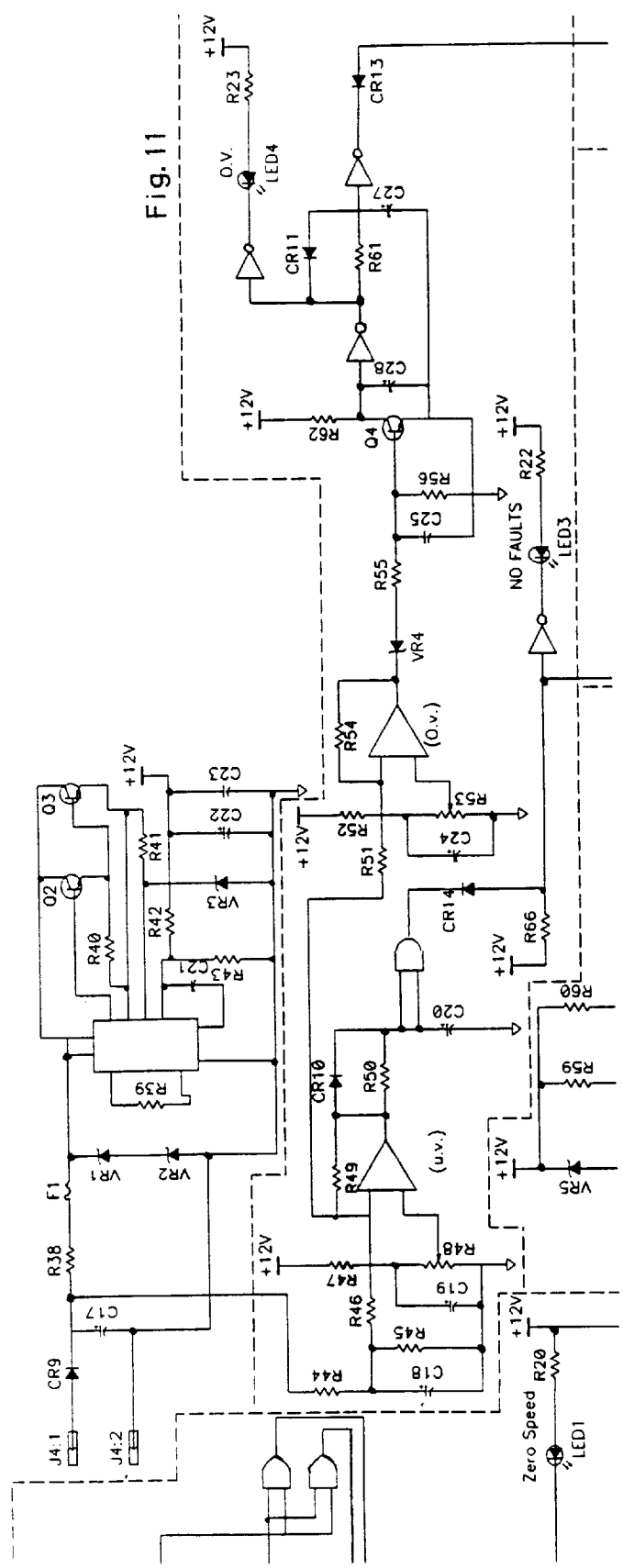

The combination of current limiting gate driver 355, R25, R57 and R99 provide the current sensing and protection for Q4. The combined logic of 361, R125, R126, C150, C151, C152, CR32, CR33 and VR1 supply a continuous gate drive power supply for Q4. The latter combined logic is also known as a charge pump circuit. The current sensing and protection circuit and the charge pump circuit are also provided by similar circuits for Q5–Q7, as shown in FIG. 14.

Under the normal operation of the motor control system 10, each power driver 38 generates bipolar current flow needed to operate each motor winding. The output nodes 368 and 369 are connected to one stator winding of the motor 11. Accordingly, the motor having six phase windings may require six power driver or H-bridges.

The operation of the preferred motor control system 10 according to the present invention will now be described.

At first, the switch is turned on to energize the motor 11 and the motor control system 10. The mode selector is set to the "Phase Shift" mode and the direction selector is set to Forward. As a result, the quad gate 301–303 of the speed encoder 24 outputs only the signal from the phase shift speed control 20. When a potentiometer of the speed control 16 is varied, differential amplifiers 113–118 are sequentially enabled, the signals being fed to the speed encoder 24. The phase shift speed control starter 22 checks a signal from the position sensor 12 through encoder buffer 14 to verify that the rotor is rotating.

In an event that the rotor is not rotating, the phase shift speed control starter 22 triggers the pulse generator shown in FIG. 7 to generate starting pulses which are fed through quad gate 240–242. When no fault has been detected by the fault detection circuits shown in FIGS. 10–12, the starting pulses are provided to the power driver 38 through anti-crossfire circuit 28, thus energizing the phase winding corresponding to the phase enabled in the phase shift speed control 20.

Once the rotor starts rotating, the speed of the motor is dictated by the speed control 16 which in turn controls the outputs of the differential amplifiers 113–118. In particular, the output signal of the differential amplifier 113 controls A-phase of the stator windings; the output signal of the differential amplifier 114 controls B-phase and so on.

When the PWM mode is selected by switching the mode selector, the quad gate 301–303 of the speed encoder 24 outputs only the signal from the PWM speed control 18. The operation of the remainder of the circuits are the same, except that the pulse generator shown in FIG. 7 is disabled during the PWM mode.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor control system for controlling a multi-phase winding motor having a plurality of phases, the motor control system comprising:

a position sensor for detecting rotation of the multi-phase winding motor;

a speed control device for controlling the speed of the multi-phase winding motor;

a phase shift control circuit coupled to the position sensor, the phase shift control circuit having at least one phase winding driver generating a drive signal in response to the speed control device; and an anti-crossfire circuit responsive to the position sensor and the drive signal of the phase shift control circuit to output non-cross firing driver signals to a power driver driving windings corresponding to at least one phase of the multi-phase winding motor.

2. A motor control system of claim 1, further comprising a speed encoder coupled to the phase shift control circuit to combine a signal from the position sensor and the drive signal from the phase shift control circuit.

3. A motor control system of claim 1, wherein the speed control device is a variable resistor.

4. A motor control system of claim 1, wherein the position sensor has two photo interrupters with respect to each phase, each of the photo interrupters being arranged separated by a predetermined shaft angle so that only one photo interrupter for the phase is enabled at a time.

5. A motor control system of claim 1, the phase shift control circuit having the same number of the phase winding drivers as the plurality of phases of the multi-phase winding motor, each phase winding driver comprising a differential amplifier generating the drive signal in response to a potential difference between a reference input voltage and a variable input voltage, wherein the variable input voltage is responsive to the speed control device.

6. A motor control system of claim 5, wherein the reference input voltage corresponding to each phase winding driver is set to a predetermined value so that depending on the variable input voltage phase winding drivers are selectively enabled.

7. A motor control system of claim 5, wherein the phase shift control circuit further includes a speed control fault detector responsive to the speed control device, wherein when the speed control device has an open circuit condition, a fault output of the speed control fault detector is pulled below of a predetermined level to disable all of the phase winding drivers.

8. A motor control system of claim 7, wherein the phase shift control circuit further includes a voltage follower coupled between the speed control fault detector and the phase winding drivers, wherein the reference input voltage for each phase winding driver is provided by the voltage follower.

9. A motor control system of claim 7, further including a phase shift starter circuit having an stop condition detector coupled to the position sensor and a pulse generator responsive to the phase shift control circuit, wherein the stop condition detector detects lack of movement of the multi-phase winding motor and enables the pulse generator to generate pulse signals and outputs the pulse signals to the phase winding drivers.

10. A motor control system of claim 9, wherein the pulse generator is coupled to the phase winding driver which is first enabled in response to the speed control device so that the pulse generator is triggered only when the phase shift control circuit is enabled.

11. A motor control system of claim 1, further including a pulse width modulator coupled to the speed control device to output a pulse signal responsive to the speed control device to drive at least one power driver.

12. A motor control system of claim 11, further including a mode selector for selecting one of the phase shift control circuit and the pulse width modulator.

13. A motor control system of claim 12, further including a fault detection circuit coupled to a switch device for selecting one of signals outputted from the pulse width modulator and the phase shift control, the fault detection circuit having a voltage converter fault detector for checking an input voltage to the motor control system, a power source fault detector for checking an input voltage to the power driver, and a thermal fault detector for checking temperature of the multi-phase winding motor, wherein the motor control system is disabled if the fault detection circuit detects a fault condition from at least one of the voltage converter fault detector, power source fault detector and thermal fault detector.

14. A motor control system comprising:

a multi-phase winding motor having a plurality of phases, each phase corresponding to a stator winding;

a position sensor for detecting rotation of the multi-phase winding motor;

a speed control device for controlling the speed of the multi-phase winding motor;

a phase shift control circuit coupled to the position sensor, the phase shift control circuit having at least one phase winding driver generating a drive signal in response to the speed control device;

a pulse width modulation control circuit responsive to the speed control device;

a selector switch for selecting one of the phase shift control circuit and the pulse width modulation;

a speed encoder coupled to the selector switch, phase shift control circuit and pulse width modulation control circuit, the speed encoder circuit outputs one of the phase shift control circuit and the pulse width modulation control circuit in response to the selector switch and combining with an output signal from the position sensor; and an anti-crossfire circuit responsive to the position sensor and the phase shift control circuit to output non-cross firing driver signals to a power driver driving windings corresponding to at least one phase.

15. A motor control system of claim 14, wherein the position sensor has two photo interrupter with respect to each phase, each of the photo interrupters being arranged separated by a predetermined shaft angle so that only one photo interrupter for the phase is enabled at a time.

16. A motor control system of claim 14, wherein the position sensor has two hall effect devices with respect to each phase, each of the hall effect devices being arranged separated by a predetermined shaft angle so that only one hall effect device for the phase is enabled at a time.

17. A motor control system of claim 14, the phase shift control circuit having the same number of the phase winding drivers as the plurality of phases of the multi-phase winding motor, each phase winding driver comprising a differential amplifier generating the drive signal in response to a potential difference between a reference input voltage and a variable input voltage, wherein the variable input voltage is responsive to the speed control device.

18. A motor control system of claim 17, wherein the reference input voltage corresponding to each phase winding driver is set to a predetermined value so that depending on the variable input voltage phase winding drivers are selectively enabled.

19. A motor control system of claim 17, wherein the phase shift control circuit further includes a speed control fault detector responsive to the speed control device, wherein when the speed control device has an open circuit condition, a fault output of the speed control fault detector is pulled below of a predetermined level to disable all of the phase winding drivers.

20. A motor control system of claim 19, wherein the phase shift control circuit further includes a voltage follower coupled between the speed control fault detector and the phase winding drivers, wherein the reference input voltage for each phase winding driver is provided by the voltage follower.

21. A motor control system of claim 19, further including a phase shift starter circuit having an stop condition detector coupled to the position sensor and a pulse generator responsive to the phase shift control circuit, wherein the stop condition detector detects lack of movement of the multiphase winding motor and enables the pulse generator to generate pulse signals and outputs the pulse signals to the phase winding drivers.

22. A motor control system of claim 21, wherein the pulse generator is coupled to the phase winding driver which is first enabled in response to the speed control device so that the pulse generator is triggered only when the phase shift control circuit is enabled.

* * * * *